A. R. & F. S. WELCH.
TRANSMISSION MECHANISM.
APPLICATION FILED AUG. 7, 1911.

1,122,341. Patented Dec. 29, 1914.

WITNESSES
J. C. Spratt
L. L. Bray

INVENTORS
Allie R. Welch
Fred S. Welch
by Parker & Burton
attys

UNITED STATES PATENT OFFICE.

ALLIE R. WELCH AND FRED S. WELCH, OF PONTIAC, MICHIGAN.

TRANSMISSION MECHANISM.

1,122,341.  Specification of Letters Patent.  Patented Dec. 29, 1914.

Application filed August 7, 1911. Serial No. 642,608.

*To all whom it may concern:*

Be it known that we, ALLIE R. WELCH and FRED S. WELCH, citizens of the United States, residing at Pontiac, county of Oakland, State of Michigan, have invented a certain new and useful Improvement in Transmission Mechanism, and declare the following to be a full, clear, and exact description of the same, such as will enable others skilled in the art to which it pertains to make and use the same, reference being had to the accompanying drawings, which form a part of this specification.

Our invention relates to automobiles and an object of our improvements is to provide an improved arrangement of the transmission mechanism with reference to the rest of the automobile and an improved construction of said mechanism. We secure this in the device illustrated in the accompanying drawings, in which—

Figure 1:
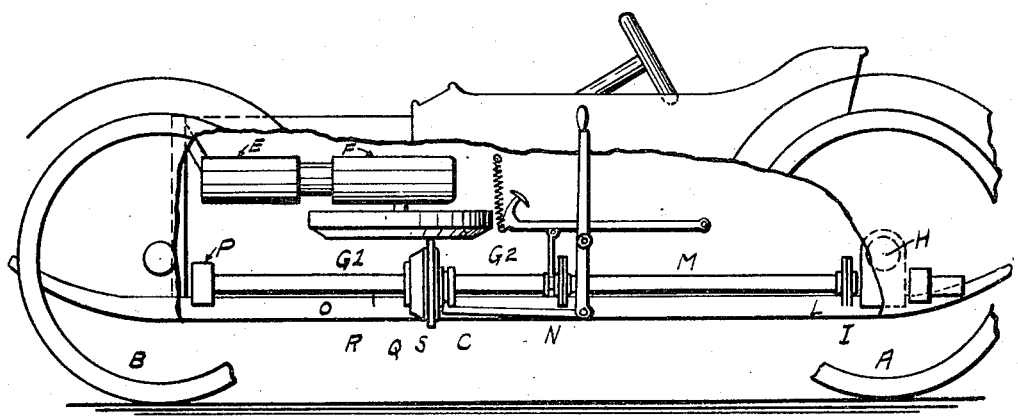
Figure 2:
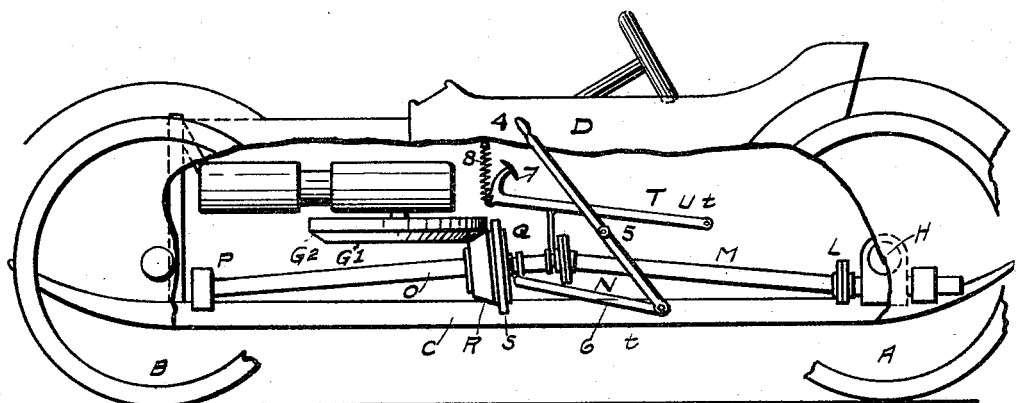
Figure 3:
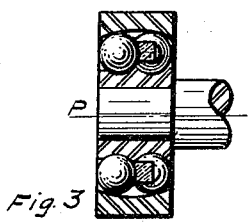
Figure 4:
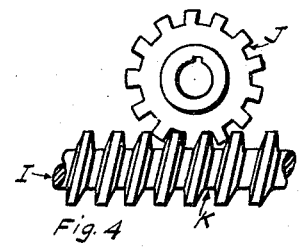

Figure 1, is an elevation of an automobile embodying our invention, parts being broken away to show the internal construction. Fig. 2, is a view similar to Fig. 1 showing the parts in a different position. Fig. 3, is a detail sectional view of one of the joints. Fig. 4, is a detail view showing the worm and wheel by which the driving shaft is actuated.

A, indicates a driving wheel and B, a front wheel.

H, is the driving shaft through which the driving wheel is actuated.

I, is a shaft upon which is a worm K, and J is a worm wheel upon the driving shaft H with which the worm K engages.

M, is a shaft united at one end to the shaft I by a universal joint L. The shaft M is united at the other end by a universal joint N to the shaft O. The shaft O is pivoted in a ball bearing P at its end remote from the shaft M. This ball bearing is shown in section in Fig. 3.

E, is the engine and F the main shaft thereof. G, is a fly-wheel upon the main shaft F. Said engine is so located in the apparatus shown that its main shaft shall extend vertically. The fly-wheel G is provided with two friction surfaces, one $G^1$ is a plane surface extending parallel to the plane of rotation to the wheel. The second $G^2$ is a conical surface surrounding the wheel G and the plane surface $G^1$. Upon the shaft O is a friction wheel Q adapted to slide longitudinally on said shaft but restrained from angular motion relative thereto. This construction is one well understood and will not therefore be described in detail.

4 is a lever pivoted to a stationary support at 5 and connected by a rod 6 with the friction wheel Q. By this or other suitable construction the wheel Q may be adjusted to different positions along the shaft O. The friction wheel Q has two friction surfaces; one a cylindrical surface coaxial with the shaft O and indicated by the reference letter S. The other a conical surface R. The friction surface S is of greater diameter than the friction surface R.

T, is a lever pivoted at $t$ and adapted to raise the connected ends of the shafts M and O and to lower the same. There is a pedal 7 on the free end of the lever T by which the same may be depressed.

8 is a spring acting to raise the lever T and press the one or the other friction surfaces of the wheel Q against a corresponding surface on the fly-wheel G. When the shafts M and O are at their lower position, as shown in Fig. 1, the friction surface S will be pressed by the spring 8 against the friction surface $G^1$ and the rotation of the wheel G will drive the shaft O and shaft M which will carry with it the shaft I actuating the main shaft of the engine through the worm K and gear wheel J. The friction wheel Q may be moved diametrically to the wheel to secure a higher or lower speed or to reverse when the friction wheel Q is moved past the center of the wheel G. When the high speed is to be used, which is generally the case, the friction wheel Q is moved toward the periphery of the wheel G and the wheel Q is raised by the action of the spring 8 so as to bring the conical surface R into contact with the conical surface $G^2$. These surfaces being properly shaped they will act upon each other without the usual grinding motion incident to disk and wheel friction gearing.

What we claim is:—

1. The combination of a friction disk, a shaft extending approximately parallel to said disk, a friction wheel upon said shaft adapted to engage said disk, said shaft consisting of two parts placed end to end, said parts being supported in bearings which are pivotally supported, a universal joint connecting the adjacent ends of the parts of said shaft, and means for bending said shaft at the universal joint to bring said friction wheel toward or away from said disk.

2. The combination of a friction disk, a shaft extending approximately parallel to said disk, a friction wheel upon said shaft adapted to engage said disk, said shaft consisting of two parts placed end to end, said parts being supported in bearings which are pivotally supported, a universal joint connecting the adjacent ends of the parts of said shaft, means for bending said shaft at the universal joint to bring said friction wheel toward or away from said disk, and means for moving said wheel along one portion of said shaft to engage the said disk at different distances from its center.

3. The combination of a friction disk having a plane friction surface surrounded by a conical friction surface concentric with said plane surface, a shaft extending approximately parallel to said disk, said shaft consisting of two parts, said parts being supported in bearings which are pivotally supported so as to permit a turning of said shaft about the pivoted ends toward and away from said disk, a universal joint uniting the adjacent ends of the parts of said shaft, a cylindrical friction wheel on said shaft adapted to engage the plane surfaces of said disk, and a conical wheel on said shaft adapted to engage the conical surface of said disk, and means for moving the adjacent ends of the parts of said shaft toward and away from said disk for the purpose described.

In testimony whereof, we sign this specification in the presence of two witnesses.

ALLIE R. WELCH.
FRED S. WELCH.

Witnesses:
VIRGINIA C. SPRATT,
ELLIOTT J. STODDARD.

Copies of this patent may be obtained for five cents each, by addressing the "Commissioner of Patents, Washington, D. C."